United States Patent
Rahmes et al.

(10) Patent No.: US 7,142,984 B2
(45) Date of Patent: Nov. 28, 2006

(54) METHOD AND APPARATUS FOR ENHANCING A DIGITAL ELEVATION MODEL (DEM) FOR TOPOGRAPHICAL MODELING

(75) Inventors: Mark Rahmes, Melbourne, FL (US);
John Karp, Indialantic, FL (US);
Anthony Smith, Melbourne, FL (US);
Stephen Connetti, Jr., Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 30 days.

(21) Appl. No.: 11/053,495

(22) Filed: Feb. 8, 2005

(65) Prior Publication Data

US 2006/0176213 A1    Aug. 10, 2006

(51) Int. Cl.
*G06F 19/00* (2006.01)
(52) U.S. Cl. ............................................. 702/5; 702/5
(58) Field of Classification Search .................. 702/5, 702/2; 382/113
See application file for complete search history.

(56) References Cited

U.S. PATENT DOCUMENTS

| | | | |
|---|---|---|---|
| 6,104,981 A | 8/2000 | Louis et al. | 702/5 |
| 6,338,027 B1 | 1/2002 | Fulton | 702/127 |
| 6,654,690 B1 | 11/2003 | Rahmes et al. | 702/5 |
| 6,664,529 B1 | 12/2003 | Pack et al. | 250/208.1 |
| 6,751,350 B1 | 6/2004 | Crinon et al. | 382/173 |
| 2004/0130702 A1 | 7/2004 | Jupp et al. | 356/5.01 |

OTHER PUBLICATIONS

"Synergy Of Image and Digital Elevation Models (DEMS) Information For Virtual Reality", C. Maire and M. Datcu, no date, 8 pages.*

"Automated Generation And Updating of Digital City Models Using High-Resolution Line Scanning Systems", G. Vozikis, no date, 6 pages.*

* cited by examiner

*Primary Examiner*—Donald McElheny, Jr.
(74) *Attorney, Agent, or Firm*—Allen, Dyer, Doppelt, Milbrath & Gilchrist, P.A.

(57) ABSTRACT

A computer implemented method is for processing an original digital elevation model (DEM) including data for terrain and a plurality of objects thereon. The method includes generating a lower-resolution DEM from the original DEM, and generating an objects-only DEM based upon a comparison of the lower-resolution DEM and the original DEM. The method further includes reducing noise in the objects-only DEM.

24 Claims, 16 Drawing Sheets

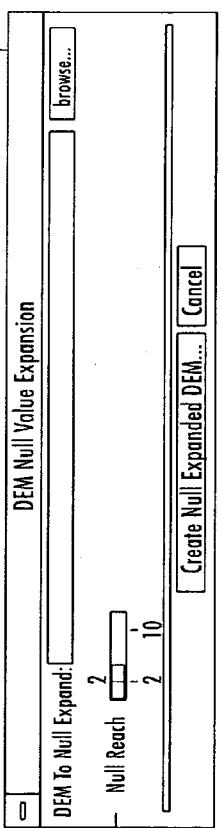
FIG. 13
FIG. 14
FIG. 15

Separate Buildings & Trees

Building DEM [_____] [Browse...]

Perimeter per Area  0.001 [0.006] 0.050       Minimum Posts  1 [7.0] 20.0

Chord Residue  0.1 [1.5] 20.0

☐ Use Maximum Tree Height
Bare Earth DEM [_____] [Browse...]

Maximum Tree Height  0.1 [12.0] 50.0

☐ Second Pass of Perimeter per Area
Perimeter per Area  0.001 [0.010] 0.050

Building Output DEM [_____] [Browse...]
Tree Output DEM [_____] [Browse...]

% Complete  0  25  50  75  100

[OK] [Cancel]

*FIG. 27*

METHOD AND APPARATUS FOR ENHANCING A DIGITAL ELEVATION MODEL (DEM) FOR TOPOGRAPHICAL MODELING

FIELD OF THE INVENTION

The present invention relates to the field of topography, and more particularly, to a method for enhancing a digital elevation model (DEM) before modeling the buildings, foliage and terrain within the DEM.

BACKGROUND OF THE INVENTION

Topographical models of geographical areas may be used for many applications, including flight simulators and flood plain analysis. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation model (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. For this reason, DEMs generally are not well suited for modeling man-made structures, such as skyscrapers in a downtown area, with sufficient accuracy for many of the above applications.

U.S. Pat. No. 6,654,690 to Rahmes et al. discloses a significant advance in topography. The '690 patent discloses an automated method for making a topographical model of an area including terrain and buildings thereon based upon randomly spaced data of elevation versus position. The '690 patent is assigned to the assignee of the present invention and is incorporated herein by reference in its entirety. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In addition, the quality of the DEMs affect modeling of the terrain, and modeling of the buildings and foliage on the terrain. As mentioned above, the '690 patent discloses that the initial DEM is separated into a terrain only DEM and a building only DEM. While this helps to enhance the quality of each respective DEM prior to modeling, there is still a need to further improve enhancement of the respective DEMs so that the displayed topographical model may be more realistic.

SUMMARY OF THE INVENTION

In view of the foregoing background, it is therefore an object of the present invention to further enhance a digital elevation model (DEM) prior to modeling the buildings, foliage and terrain within the DEM.

This and other objects, features, and advantages in accordance with the present invention are provided by a computer implemented method for processing an original digital elevation model (DEM) including data for terrain and a plurality of objects thereon. The method may comprise generating a lower-resolution DEM from the original DEM, generating an objects-only DEM based upon a comparison of the lower-resolution DEM and the original DEM, and reducing noise in the objects-only DEM.

Reducing noise in the objects-only DEM may comprise identifying nulls in the objects-only DEM based upon a first window size, expanding the nulls identified in the objects-only DEM, and filling in the expanded nulls in the objects-only DEM to generate a first refined objects-only DEM.

The method may further comprise identifying nulls in the first refined objects-only DEM based upon the first window size, expanding the nulls identified in the first refined objects-only DEM, and filling in the expanded nulls in the first refined objects-only DEM to generate a second refined objects-only DEM.

A noise-only DEM may be generated based upon a comparison between the first refined objects-only DEM and the second refined objects-only DEM. The noise-only DEM may be subtracted from the second refined objects-only DEM for generating a final refined objects-only. The final refined objects-only DEM may have significantly less noise than the initial objects-only DEM that is typically used in the prior art for topographical modeling. This advantageously results in a more realistic topographical modeling.

Another embodiment for enhancing the objects-only DEM is as follows. A lower-resolution DEM may be generated from the original DEM, and nulls in the lower-resolution DEM are identified based upon a first window size, and the nulls are filled in. An objects-only DEM may then be generated based upon a comparison of the lower-resolution DEM with the filled in nulls and the original DEM. An original DEM without the objects may be generated based upon a comparison between the objects-only DEM and the original DEM. Nulls in the original DEM without the objects are identified based upon the first window size, and the nulls are expanded.

A lower-resolution DEM without the objects is generated from the original DEM without the objects, and nulls in the lower-resolution DEM without the objects are identified based upon the first window size, and the nulls are filled in for generating a terrain-only DEM. A refined objects-only DEM may then be generated based upon a comparison of the terrain-only DEM with the original DEM. The refined objects-only DEM may have significantly less noise than the initial objects-only DEM that is typically used in the prior art for topographical modeling. Again, this advantageously results in a more realistic topographical modeling.

A refined terrain-only DEM may also be generated. This comprises generating a refined DEM without the objects based upon a comparison between the refined objects-only DEM and the original DEM, generating a lower-resolution DEM without the objects from the refined DEM without the objects, and identifying nulls in the lower-resolution DEM without the objects based upon the first window size. The nulls are then filled in for generating the refined terrain-only DEM. In addition, a final refined objects-only DEM may be generated based upon a comparison of the refined terrain-only DEM with the original DEM.

Another aspect in accordance with the present invention is directed to a computer-readable medium having stored thereon a data structure for processing a digital elevation model (DEM) including data for terrain and a plurality of objects thereon. A first embodiment of the computer-readable medium may comprise a first data field containing data for generating a lower-resolution DEM from the original DEM, a second data field containing data for generating an objects-only DEM based upon a comparison of the lower-resolution DEM and the original DEM, and a third data field containing data for reducing noise in the objects-only DEM.

A second embodiment of the computer-readable medium may comprise a first data field containing data for generating a lower-resolution DEM from the original DEM, a second data field containing data for identifying nulls in the lower-resolution DEM based upon a first window size and filling in the nulls, and a third data field containing data for generating an objects-only DEM based upon a comparison of the lower-resolution DEM with the filled-in nulls and the original DEM. A fourth data field may contain data for generating an original DEM without the objects based upon a comparison between the objects-only DEM and the original DEM, and a fifth data field may contain data for identifying nulls in the original DEM without the objects based upon the first window size, and expanding the nulls. A sixth data field may contain data for generating a lower-resolution DEM without the objects from the original DEM without the objects, and a seventh data field may contain data for identifying nulls in the lower-resolution DEM without the objects based upon the first window size, and filling in the nulls for generating a terrain-only DEM. An eighth data field may contain data for generating a refined objects-only DEM based upon a comparison of the terrain-only DEM with the original DEM.

Yet another aspect in accordance with the present invention is directed to a computer system for topographical modeling comprising a processor for processing an original digital elevation model (DEM) including data for terrain and a plurality of objects thereon. The processor may process the first and second embodiments of the computer-readable mediums as discussed above.

BRIEF DESCRIPTION OF THE DRAWINGS

FIGS. 11–13 are computer screen displays corresponding to DEM subtractions for generating an objects-only DEM and a DEM without the objects in accordance with the present invention.

FIGS. 14–15 are computer screen displays corresponding to a null expand process performed on the DEM without the objects as provided in FIG. 13.

FIG. 27 is a computer screen display for setting the parameters associated with separating the final objects-only DEM into a building DEM and a foliage DEM in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
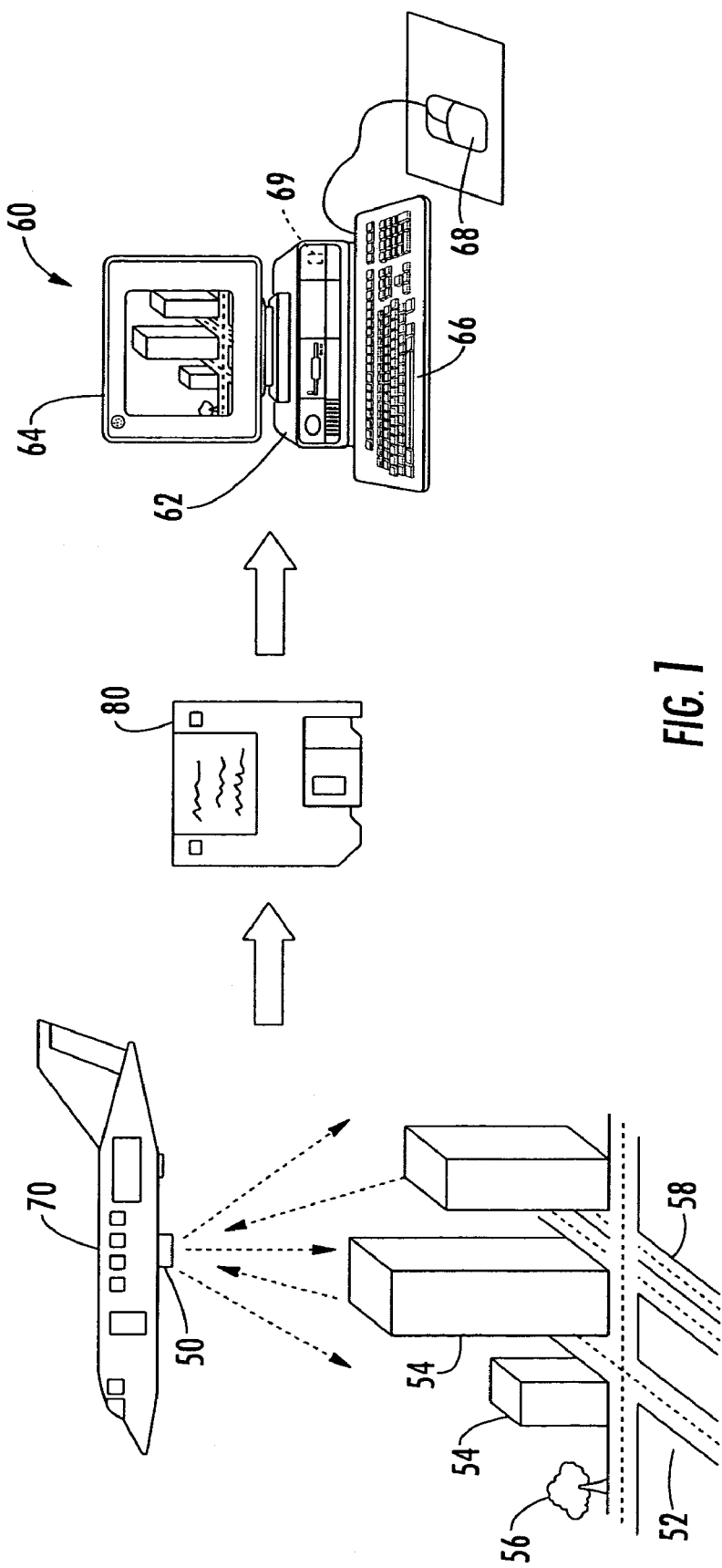
FIG. 1 is a schematic block diagram of collecting topographical data, and generating a topographical model from the collected topographical data in accordance with the present invention.

A collector 50 for collecting topographical data and a system 60 for generating a digital elevation model (DEM) from the collected topographical data will now be explained with reference to FIG. 1. The DEM is of an area that includes terrain 52 and objects on the terrain, wherein the objects may be buildings 54 and foliage 56. The foliage 56 primarily includes trees, and consequently, foliage and trees will be interchangeable. Modeling of the terrain 52, buildings 54 and trees 56 is based upon randomly or arbitrarily spaced data of elevation versus position on the area.

The collector 50, such as a light detection and ranging (LIDAR) collector, may be used for collecting the randomly spaced data. The randomly spaced data may nominally be a set of non-uniformly spaced measurements of position and height. The LIDAR collector 50 may be carried by an airplane 70 over the area of interest, such as a city. The area may also include relatively small features, such as roads 58, for example, as compared to the buildings 54 and trees 56.

Those of skill in the art will appreciate that a LIDAR source provides data including elevation versus position information from a single image. Multiple optical images of the area taken from different perspectives are generally required to provide elevation versus position data, whereas this same information may be obtained from a single LIDAR image. Of course, the present invention may use elevation data versus position data from sources such as optical (e.g., photography), electro-optical, and infrared sources, for example, in addition to LIDAR collectors as will be appreciated by those of skill in the art. The position information provided by the LIDAR data may include latitude and longitude information, for example, though other suitable position indicators may also be used.

Once the randomly spaced data is collected, the data may be stored on a storage medium 80, such as a magnetic or optical disk, for example, for transfer to a computer 62. Of course, other suitable methods for transferring data may also be used, as readily appreciated by those skilled in the art. The randomly spaced data is used by the computer 62 to generate a DEM for viewing.

A display 64 is connected to the computer 62 for viewing the DEM. Input devices such as a keyboard 66 and mouse 68 are also connected to the computer 62. In accordance with the present invention, the computer 62 includes a processor 69 for 1) enhancing the DEM by creating a terrain-only DEM and an objects-only DEM, and then removing noise from the objects-only DEM, and 2) separating the objects-only DEM into a building DEM and a foliage DEM.

Figure 2:
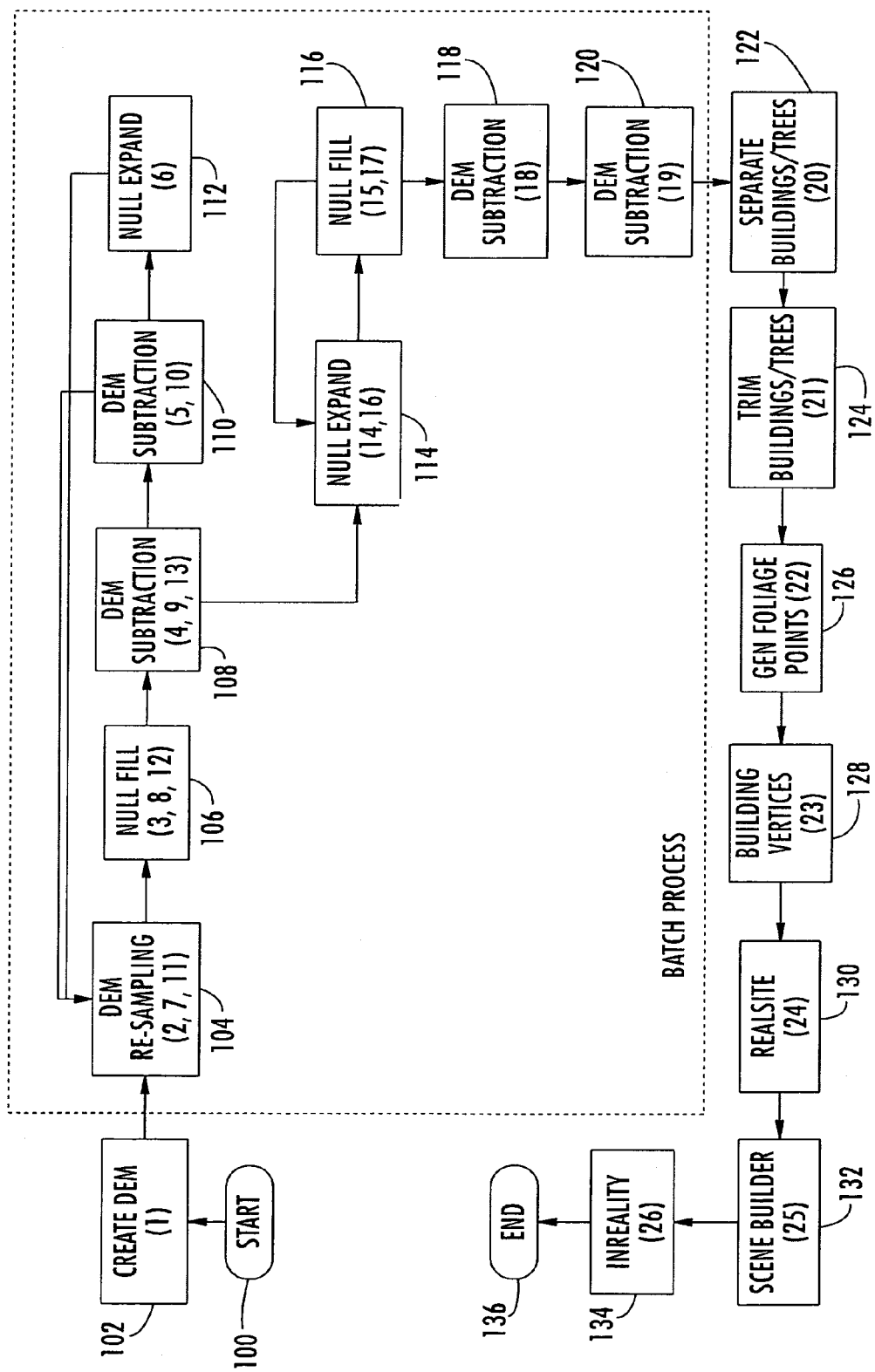
FIG. 2 is a flow diagram for generating a topographical model in accordance with the present invention.

Generating and enhancing an original or initial DEM will now be discussed with reference to the flow diagram of FIG. 2, as well as to the computer display screens illustrated in FIGS. 3–25. In the flow diagram, steps (1)–(19) will initially be discussed, wherein steps (2)–(19) are considered to be part of a batch process as will be discussed in greater below. In the batch process, some of the blocks illustrated in the flow diagram will be discussed more than once since their respective functions are repeated based upon a looping process. The number associated with each step being discussed is provided in parenthesis within the corresponding block to better illustrate the method for enhancing the original DEM.

Figure 3:
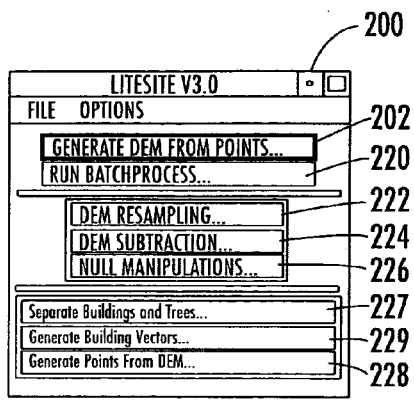
FIGS. 3–5 are computer screen displays corresponding to generating an original DEM in accordance with the present invention.
Figure 4:
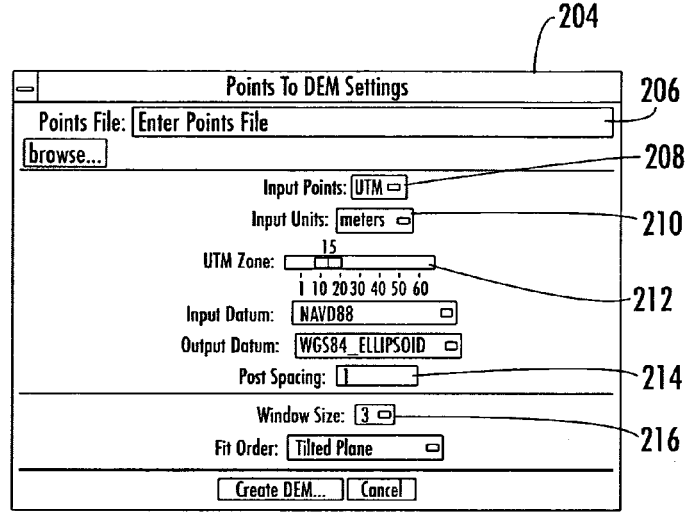

From the start (Block 100), an initial step (1) is using the computer 62 in Block 102 to generate an original DEM from the randomly spaced data as provided via the storage medium 80. Referring to the initial computer screen 200 as illustrated in FIG. 3, the user selects the "Generate DEM From Points" in field 202. This causes a "Points To DEM Settings" computer screen 204 to be displayed, as illustrated in FIG. 4.

Figure 5:
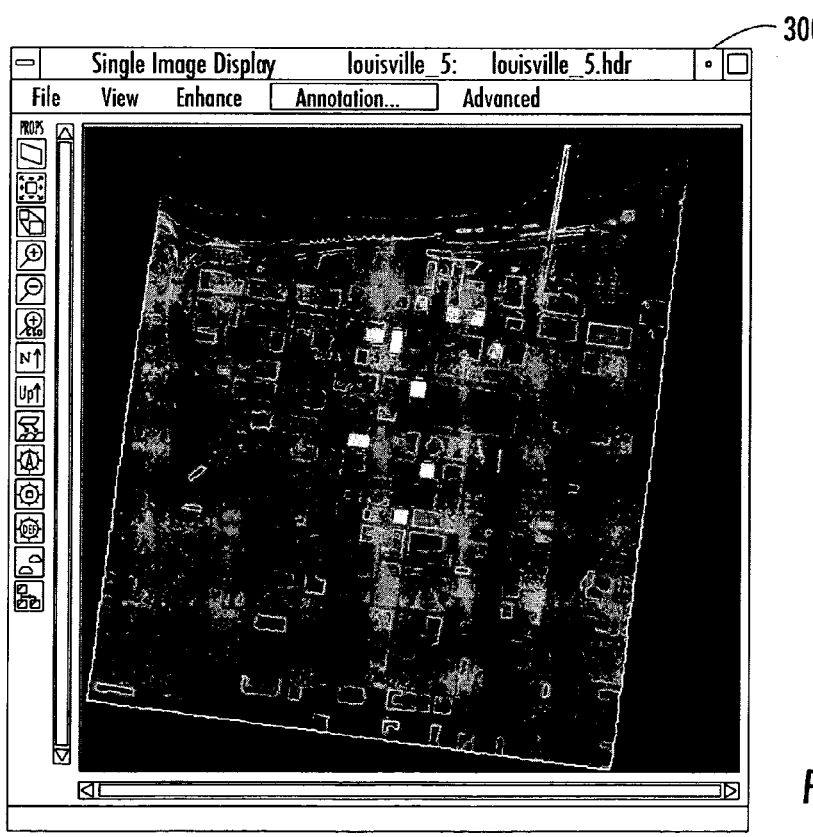

In the "Points To DEM Settings" computer screen 204, the name of the file storing the collected data is entered in field 206. The format of the points is selected in field 208. In this case, the points are based upon a universal transverse mercator (UTM) grid. The unit of measure of the points is selected in field 210, which is in meters, for example. The UTM grid includes 60 north-south zones, with each zone being 6 degrees wide in latitude. The UTM zone of interest is selected in field 212. Zone 15 is selected in field 212, for example. The resolution of the data is selected in field 214, and the window filter size is selected in field 216, as readily appreciated by those skilled in the art. The generated original DEM is provided in the computer screen 300 as illustrated in FIG. 5.

Steps (2)–(19) for enhancing the original DEM are initiated by selecting the "Run Batch Process" in field 220 from the initial computer screen 200 as illustrated in FIG. 3. As the batch process is run, fields 222, 224 and 226 allow the user to set certain parameters associated with the batch process. These parameters will be discussed below.

Figure 6:
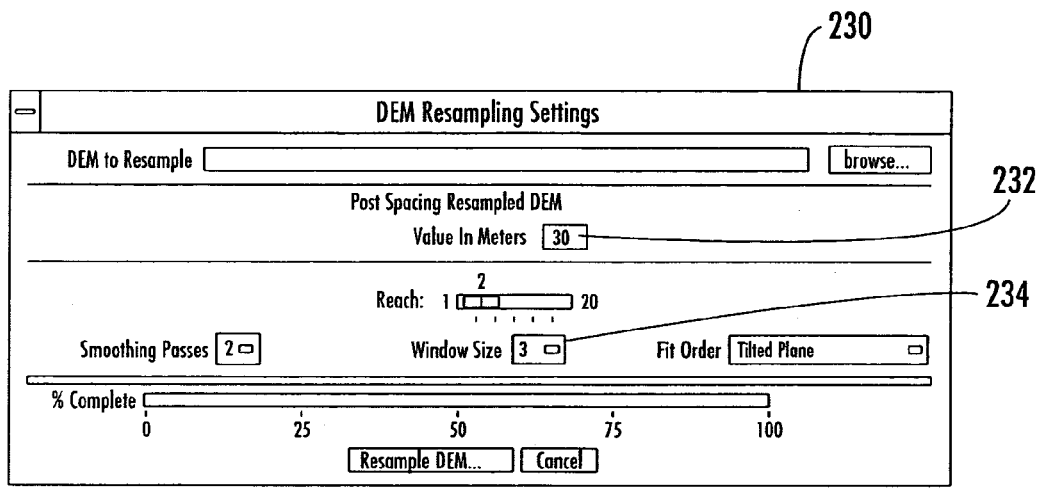
FIGS. 6–7 are computer screen displays corresponding to a re-sampling of the original DEM in accordance with the present invention.
Figure 7:
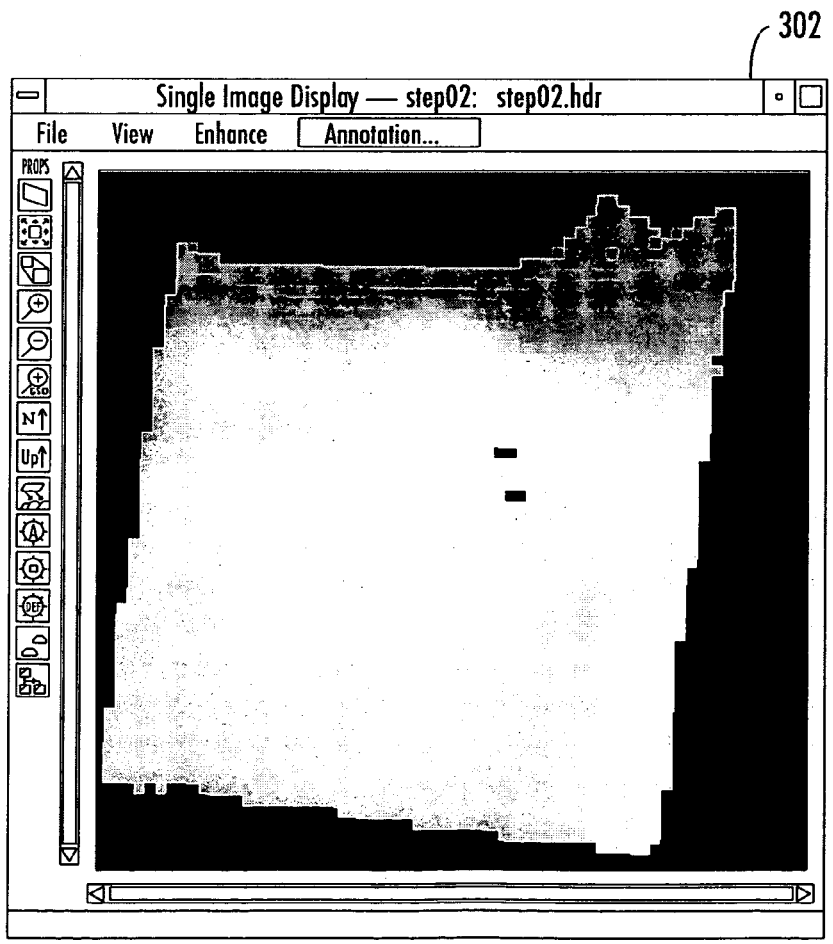
Figure 8:
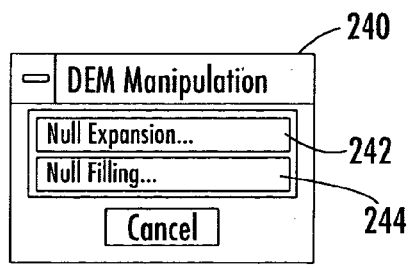
FIGS. 8–10 are computer screen displays corresponding to a null fill process performed on the re-sampled DEM in accordance with the present invention.

In Block 104, step (2) is the re-sampling of the original DEM. The settings associated with the re-sampling are provided in the computer screen 230 as illustrated in FIG. 6. The original DEM had a resolution of 1 meter, for example, and will now be re-sampled at a lower resolution. The resolution is set in field 232, which is 30 meters, for example. The window filter size is also selected in field 234. The result is provided in the computer screen 302 as illustrated in FIG. 7, which is a smoothing of the objects 54, 56 on the terrain 52.

Figure 9:
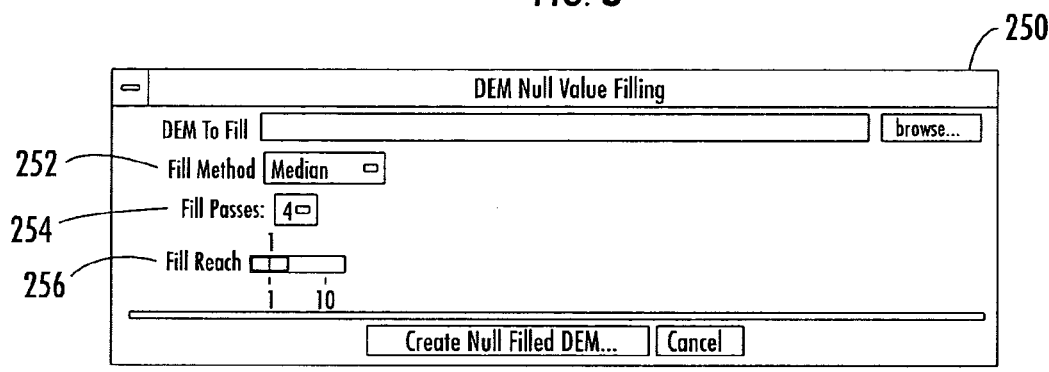
Figure 10:
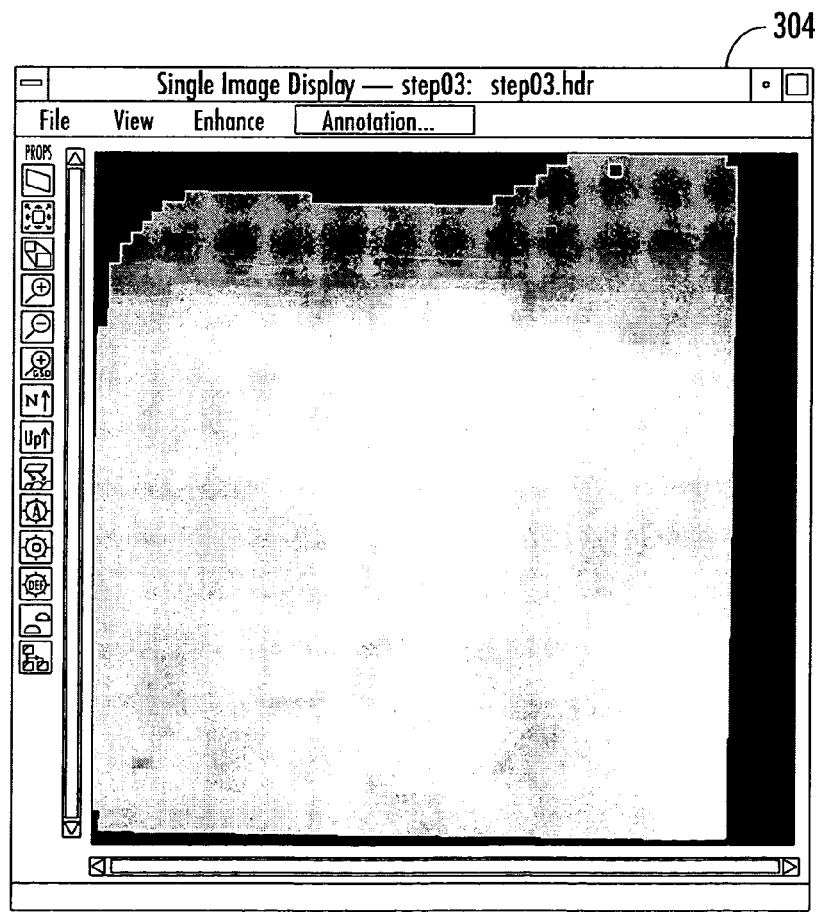

In Block 106, a null fill is performed on the re-sampled DEM. The null fill is associated with the null manipulations provided in field 226 from the initial computer screen 200 as illustrated in FIG. 3. The null manipulations may be divided into a null expansion or a null fill as provided in computer screen 240 in FIG. 8. Field 242 corresponds to the null expansion and field 244 corresponds to the null filling. Since a null fill is being performed, computer screen 250 is displayed as illustrated in FIG. 9. The settings associated with the null fill include field 252 for the method of the fill, field 254 for the number of fill passes to be performed, and field 256 for the fill reach. The resulting re-sampled DEM after null filling is provided in computer screen 304 as illustrated in FIG. 10.

Figure 11:
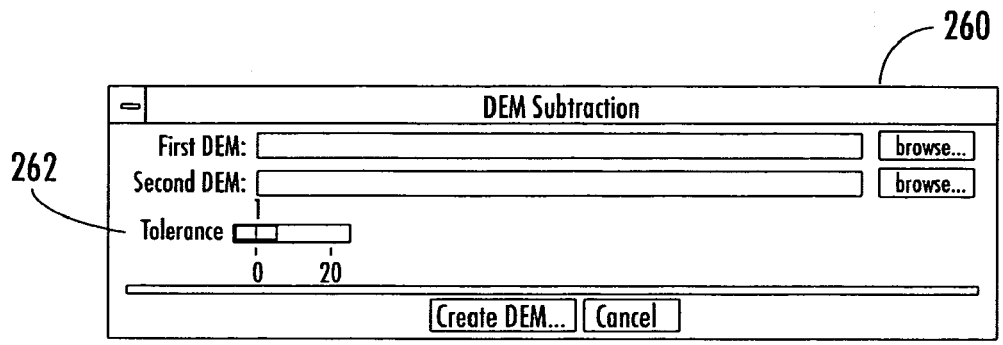
Figure 12:
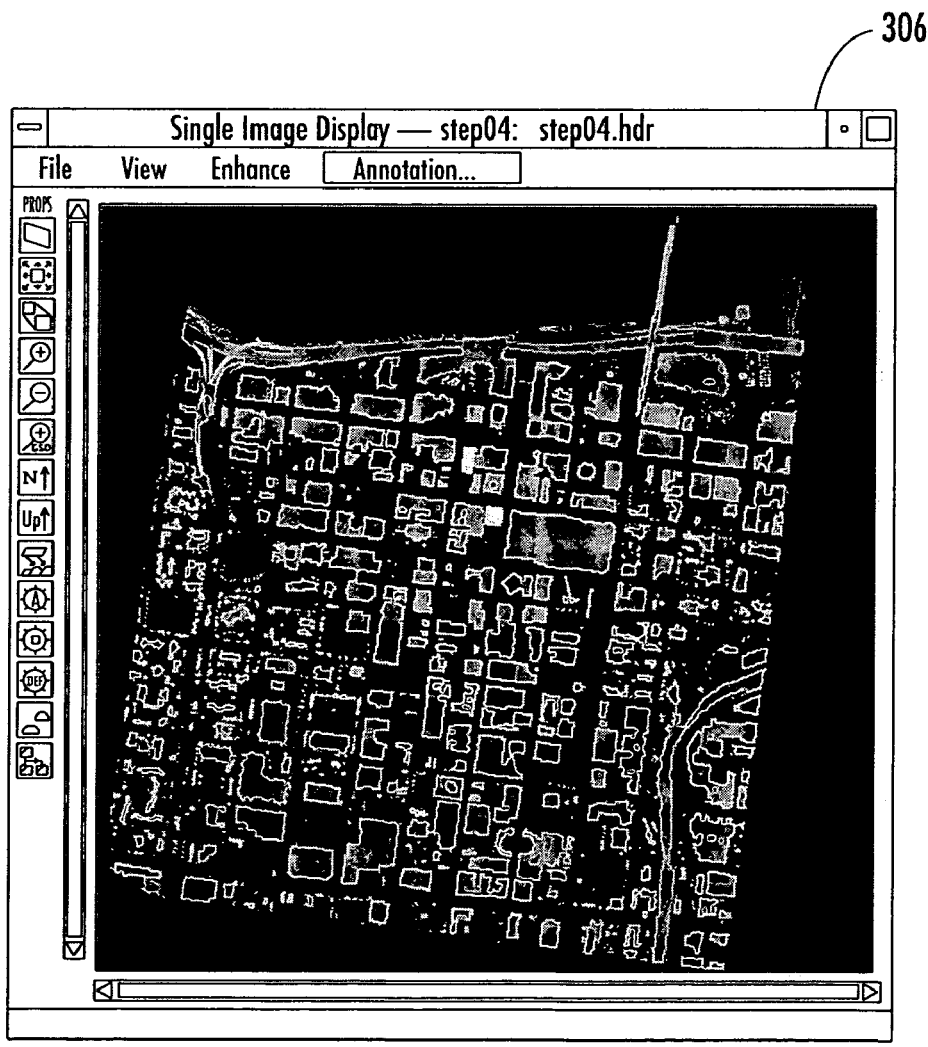
Figure 17:
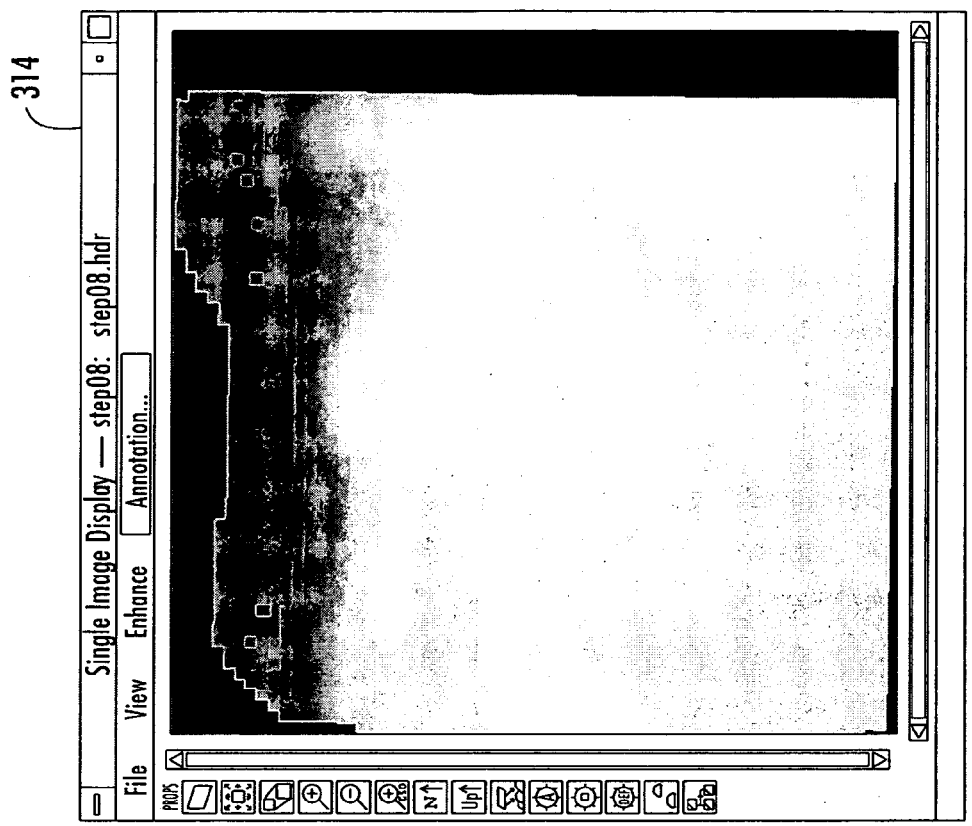
FIGS. 16–17 are computer screen displays corresponding to generation of a terrain-only DEM in accordance with the present invention.

In Block 108, a DEM subtraction is performed. Computer screen 260 is associated with the DEM subtraction as illustrated in FIG. 11. The threshold used in the DEM subtraction is selected in field 262. The re-sampled DEM after null filling in step (3) is subtracted from the original DEM in step (1) to produce an objects-only DEM. The objects-only DEM is provided in the computer screen 306 as illustrated in FIG. 12.

In Block 110, step (5) is another DEM subtraction. The objects-only DEM from step (4) is subtracted from the original DEM in step (1) to produce a DEM without the objects. This DEM is provided in the computer screen 308 as illustrated in FIG. 13.

A null expansion is performed in Block 112 on the DEM without the objects, which corresponds to step (6). The computer screen 270 is associated with the null expansion as illustrated in FIG. 14. The nulls are expanded corresponding to the value selected in field 272. The null expansion makes sure that all the objects have been removed so that the result is a DEM without the objects at the 1 meter resolution, as provided in the computer screen 310 and as illustrated in FIG. 15.

Figure 16:
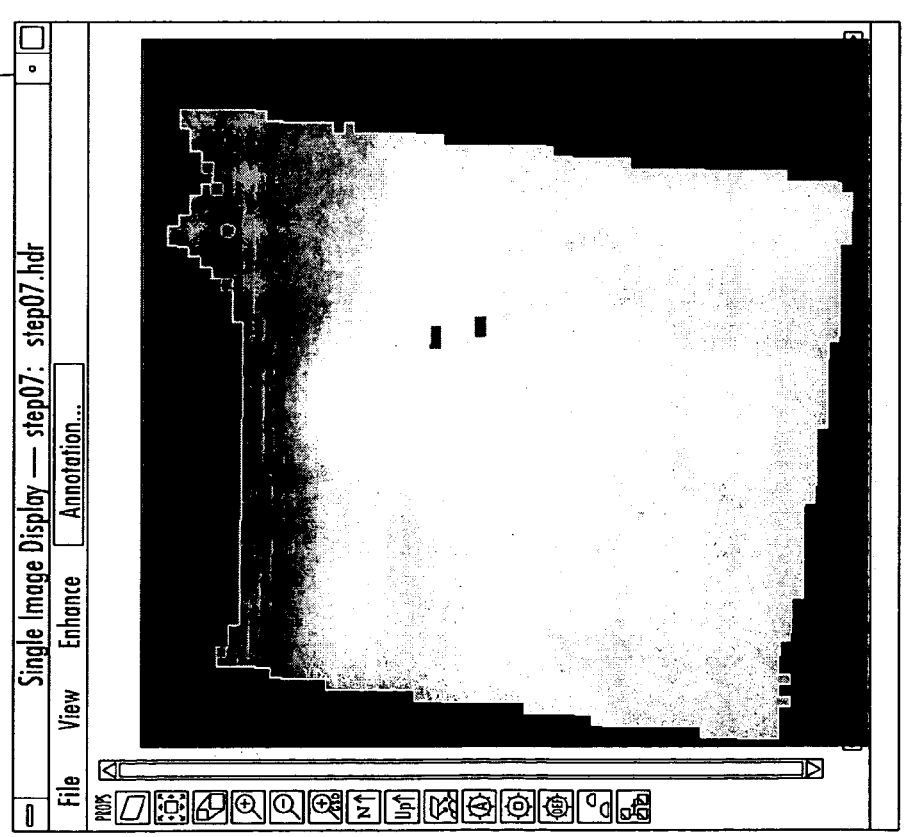

The run batch process now loops back to Block 104 for step (7). Block 104 performs a re-sampling on the DEM without the objects as provided in FIG. 15. The re-sampling is performed at a lower resolution, that is, from 1 meter to 30 meters. The result is provided in the computer screen 312 as illustrated in FIG. 16.

Figure 19:
FIGS. 18–19 are computer screen displays corresponding to DEM subtractions for generating an enhanced objects-only DEM and an enhanced DEM without the objects in accordance with the present invention.
Figure 18:
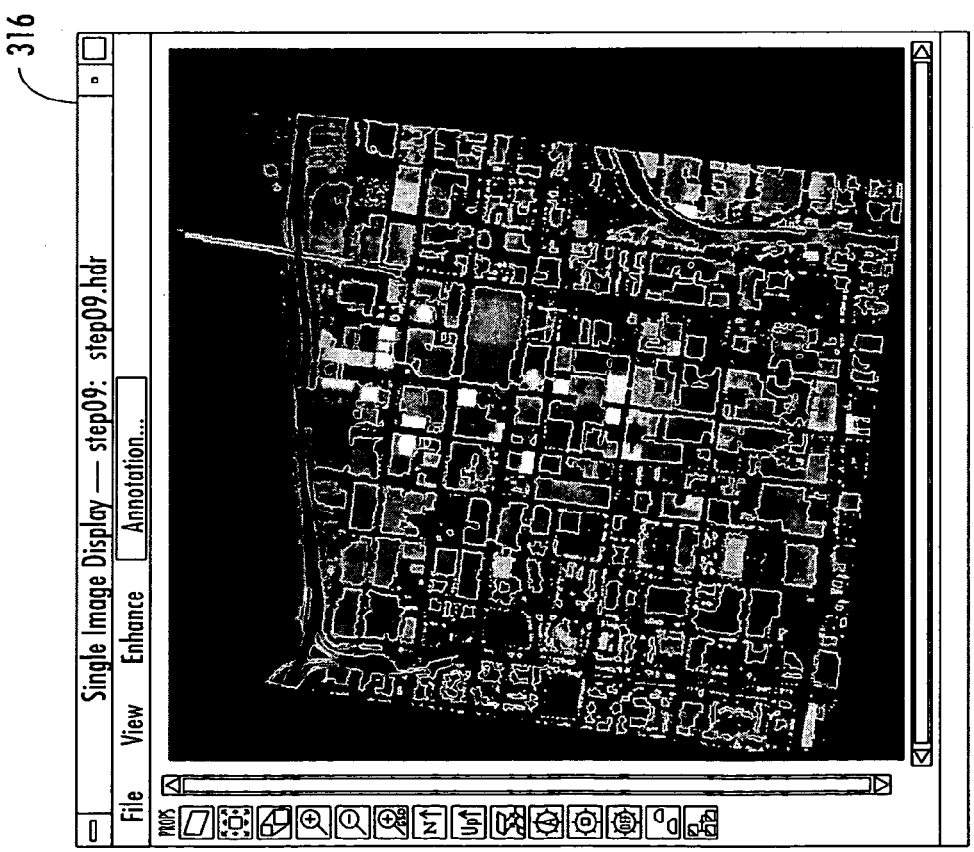
Figure 21:
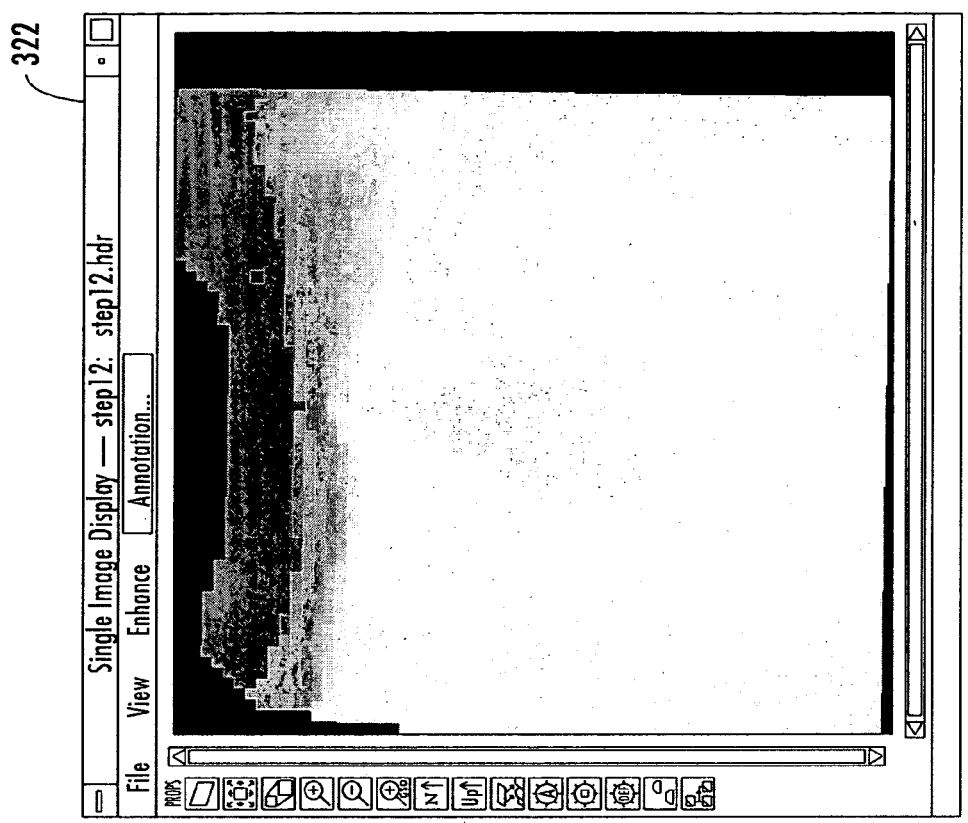
FIGS. 20–22 are computer screen displays corresponding to the generation of a final terrain-only DEM and a further enhanced objects-only DEM in accordance with the present invention.

In Block 106, a second null fill is performed, which corresponds to step (8). The second null fill is performed on the re-sampled DEM without the objects as provided in Block 112. This process generates a terrain-only DEM as provided in the computer screen 314 in FIG. 17. In Block 108, a second DEM subtraction is performed, which corresponds to step (9). The terrain-only DEM from step (8) is now subtracted from the original DEM in step (1) to produce an enhanced objects-only DEM. The enhanced objects-only DEM is provided in the computer screen 316 as illustrated in FIG. 18. In Block 110, step (10) is another DEM subtraction step. The enhanced objects-only DEM from step (9) is subtracted from the original DEM in step (1) to produce an enhanced DEM without the objects. The enhanced DEM without objects is provided in the computer screen 318 as illustrated in FIG. 19.

Figure 20:
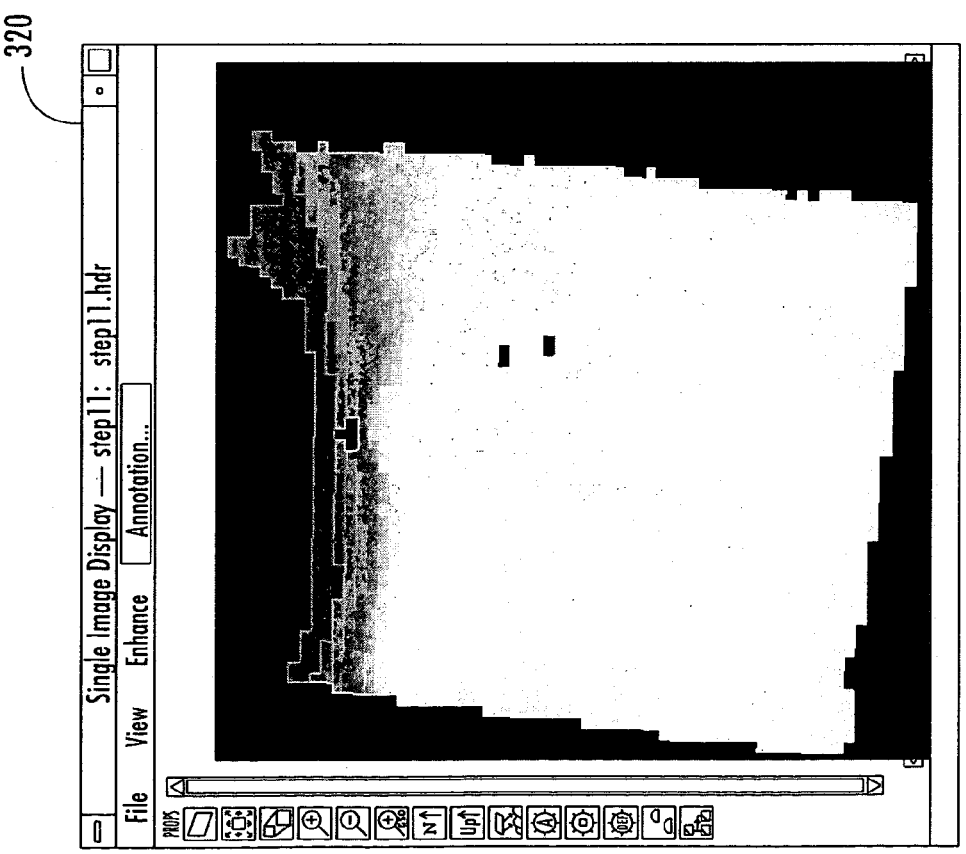
Figure 23:
FIG. 23 is a computer screen display corresponding to the generation of a second further enhanced objects-only DEM based upon a null fill/null expansion in accordance with the present invention.

For step (11), the run batch process again loops back to Block 104. Block 104 performs another re-sampling on the enhanced DEM without the objects as provided by Block 110. As before, the re-sampling is also performed at a lower resolution, that is, from 1 meter to 30 meters. The result is provided in the computer screen 320 as illustrated in FIG. 20.

In Block 106, another null fill is performed, which corresponds to step (12). This third null fill is performed on the re-sampled DEM without the objects as provided by Block 104 to generate an enhanced terrain-only DEM as provided in the computer screen 322 in FIG. 21. This DEM is also referred to as the final terrain-only DEM.

Figure 22:

In Block 108, a third DEM subtraction is performed, which corresponds to step (13). The enhanced terrain-only DEM from step (12) is subtracted from the original DEM in step (1) to produce an even further enhanced objects-only DEM. The further enhanced objects-only DEM is provided in the computer screen 324 as illustrated in FIG. 22.

A null expansion is performed on the further enhanced objects-only DEM in Block 114, which corresponds to step (14). In Block 116, a null fill is performed, which corresponds to step (15). Steps (14) and (15) are performed to remove noise from around the objects to generate an even further enhanced objects-only DEM. The process loops back to Block 114 so that steps (16) and (17) are performed. That is, another null expansion and null fill are performed to generate a second further enhanced objects-only DEM as provided in the computer screen 326 in FIG. 23.

Figures 24, 25:
FIG. 24 is a computer screen display corresponding to the generation of a noise-only DEM in accordance with the present invention.
FIG. 25 is a computer screen display corresponding to the generation of a final objects-only DEM in accordance with the present invention.

In Block 118, a DEM subtraction is performed. The second further enhanced objects-only DEM from step (17) is subtracted from the further enhanced objects-only DEM from step (15) to produce a noise-only DEM. The noise-only DEM is provided in the computer screen 328 as illustrated in FIG. 24.

In Block 120, another DEM subtraction (step 19) is performed. The noise-only DEM from step (18) is subtracted from the second further enhanced objects-only DEM from step (15) to produce a final objects-only DEM. The final objects-only DEM is provided in the computer screen 330 as illustrated in FIG. 25.

As discussed above for steps (2)–(19), a final terrain-only DEM and a final objects-only DEM have been generated. Compared to prior art DEMS, these DEMs are enhanced as a result of the looping iterations performed in steps (2)–(19). Yet another aspect in accordance with the present invention that will now be discussed is the separation of the final objects-only DEM into a building DEM and a foliage DEM. In other words, the final objects-only DEM is separated into two separate DEMs so that each DEM may be separately processed.

Figure 26:
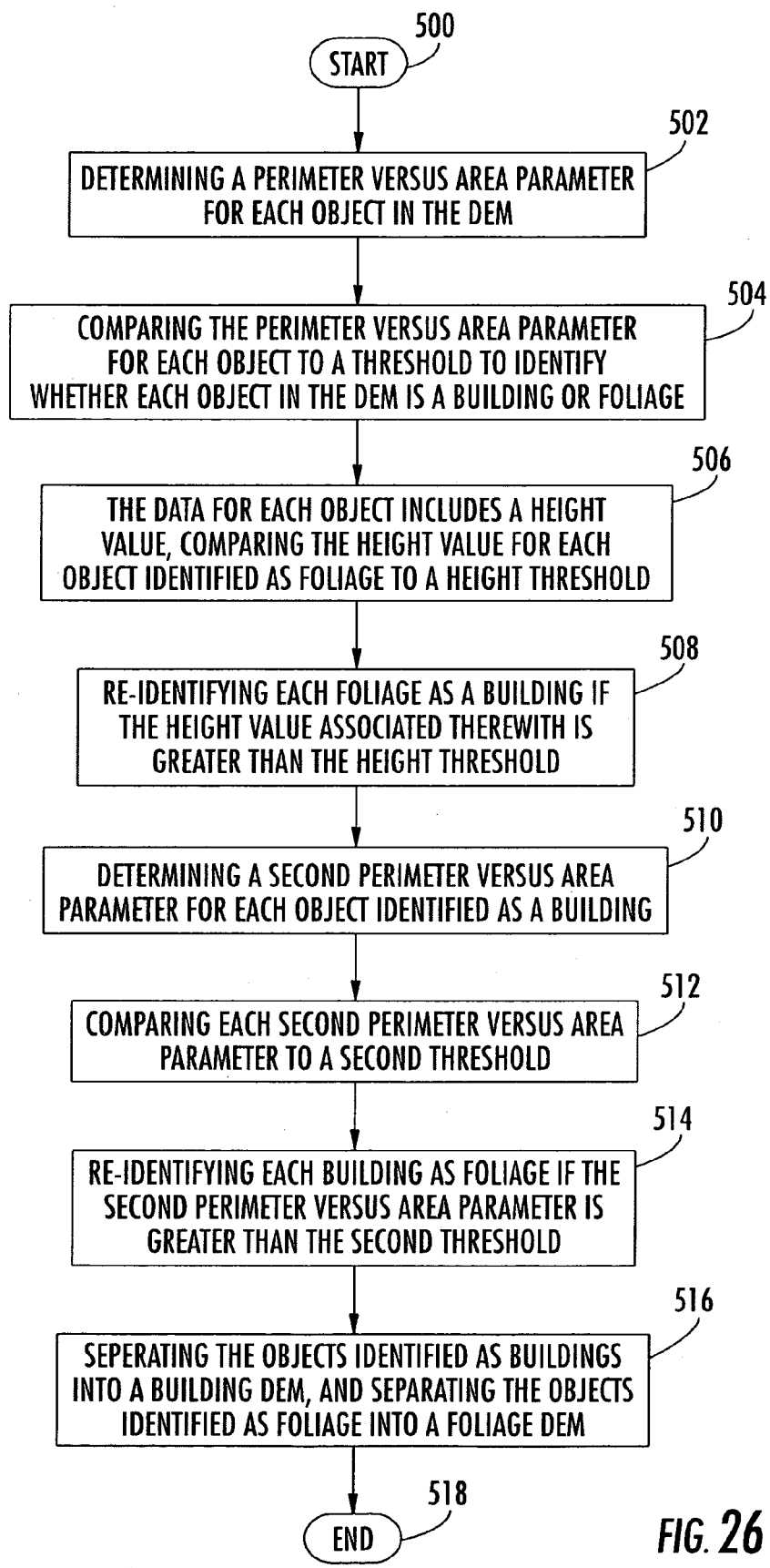
FIG. 26 is a flow diagram for separating the final objects-only DEM as provided in FIG. 25 into a building DEM and a foliage DEM.
Figure 28:
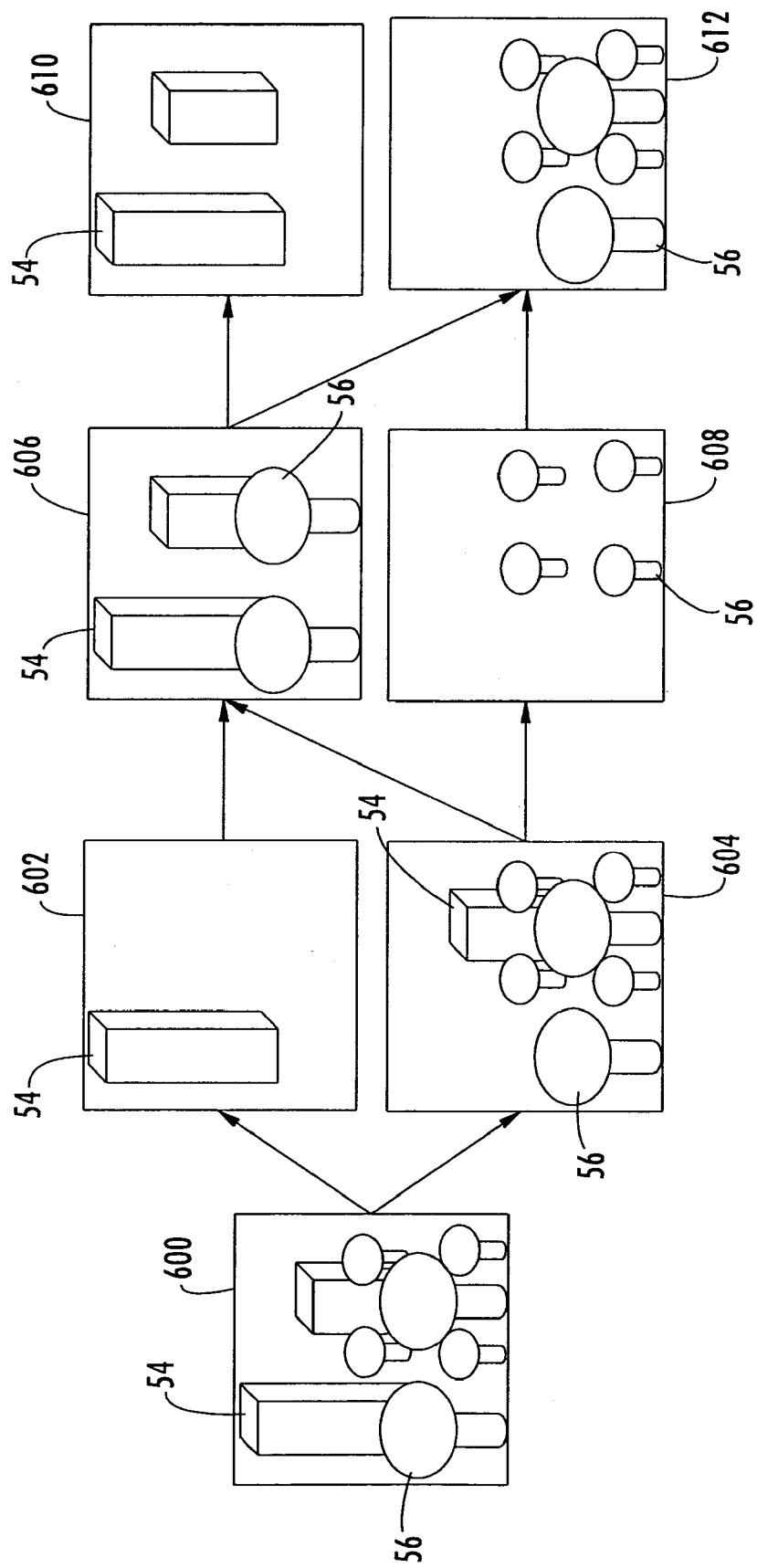
FIG. 28 is a pictorial representation of the steps for separating the final objects-only DEM into a building DEM and a foliage DEM in accordance with the present invention.

Separating the final objects-only DEM into a building DEM and a foliage DEM will now be discussed with reference to the flow diagram illustrated in FIG. 26, as well as to FIGS. 27–28. Referring to the computer screen 200 initially illustrated in FIG. 3, the user selects "Separate Buildings and Trees" in field 227. This causes a "Separate Buildings and Trees" computer screen 410 to be displayed, as illustrated in FIG. 27.

Still referring to FIG. 27, the user has the option of selecting several threshold parameters. Since the separation is performed based upon calculating a perimeter per area for each object, as well as the height of each object, corresponding comparison threshold values are set via the computer screen 410. For instance, the perimeter per area threshold is set in field 412. The minimum size of each object to be considered is set in field 414. This field is labeled as the minimum posts. The chord residue is selected in field 416, and corresponds to a width or length of a side of the object being considered. A maximum tree height is selected in field 418. A second threshold to be associated with a second perimeter per area test is selected in field 420. This second threshold selected in field 420 may be different than the first threshold selected in field 412.

To start separating (Block 500) the final objects-only DEM into a building DEM and a foliage DEM, a perimeter versus area parameter for each object in the final objects-only DEM is determined in Block 502. For purposes of explaining the present invention, reference will also be made to FIG. 28, which provides a pictorial representation of how the final objects-only DEM is separated into a building DEM and a foliage DEM. For instance, a simplified representation representing the final objects-only DEM as initially illustrated in FIG. 25 is provided in frame 600 in FIG. 28.

As illustrated in frame 600, the objects include buildings 54 and trees 56 grouped together in the same DEM. The perimeter versus area parameter for each object is compared to the selected threshold in Block 504 to identify whether each object in the DEM is a building 54 or foliage 56. Based upon the comparison to the threshold, the objects are separated into a building DEM and a foliage DEM, as illustrated in frames 602 and 604.

The data for each object includes a height value, and the height value for each object identified as foliage 56 in frame 604 is compared to a height threshold in Block 506. In Block 508, each foliage 56 in frame 604 is re-identified as a building 54 if the height value associated therewith is greater than the height threshold. As illustrated in frames 606 and 608, the building 54 initially identified as foliage 56 in frame 604 has been re-identified as a building in frame 606. However, tall trees 56 in frame 604 have now been identified as buildings based upon the comparison to the height threshold, as shown in frame 606.

In Block 510, a second perimeter versus area parameter is determined for each object identified as a building in frame 606. Each second perimeter versus area parameter is compared to a second threshold in Block 512. Each building 54 is re-identified as foliage 56 if the second perimeter versus area parameter is greater than the second threshold in Block 514.

The objects identified as buildings 54 are separated into a building DEM, and the objects identified as foliage are separated into a foliage DEM in Block 516. Separate building and foliage DEMs advantageously allow more realistic topographical models to be generated with significantly less user intervention. The building DEM is represented by frame 610, and the foliage DEM is represented by frame 612. The method for separating the final objects-only DEM into a building DEM and a foliage DEM ends at Block 518. The above steps for separating the final objects-only DEM into two separate DEMs correspond to step (20) in FIG. 2.

The remaining steps (21)–(26) will now be discussed. The buildings 54 and the trees 56 will each be modeled differently. Block 124 corresponds to step (21) and is optional, but allows the user to manually clean up or edit the separation of the buildings 54 and trees 56 in case the automatic process failed to correctly identify each object correctly.

In Block 126, which corresponds to step (22), each foliage in the foliage DEM 612 is modeled as 3D points. The user selects the "Generate Points From DEM" in field 228 as shown in FIG. 3 to convert the points into a list of x (latitude), y (longitude) and z (height).

In Block 128, which corresponds to step (23), the buildings are modeled as vectors. Modeling buildings as vectors is disclosed in U.S. Pat. No. 6,654,690 as discussed in the background section. Texture is placed on the polygons representing the buildings in Block 130, which corresponds to step (24). In other words, images are placed on the polygons to give the topographical model a realistic look. RealSite™ is one such commercially available tool to perform this task. RealSite™ was developed by the Harris Corporation, which is assignee of the present invention.

Figure 29:
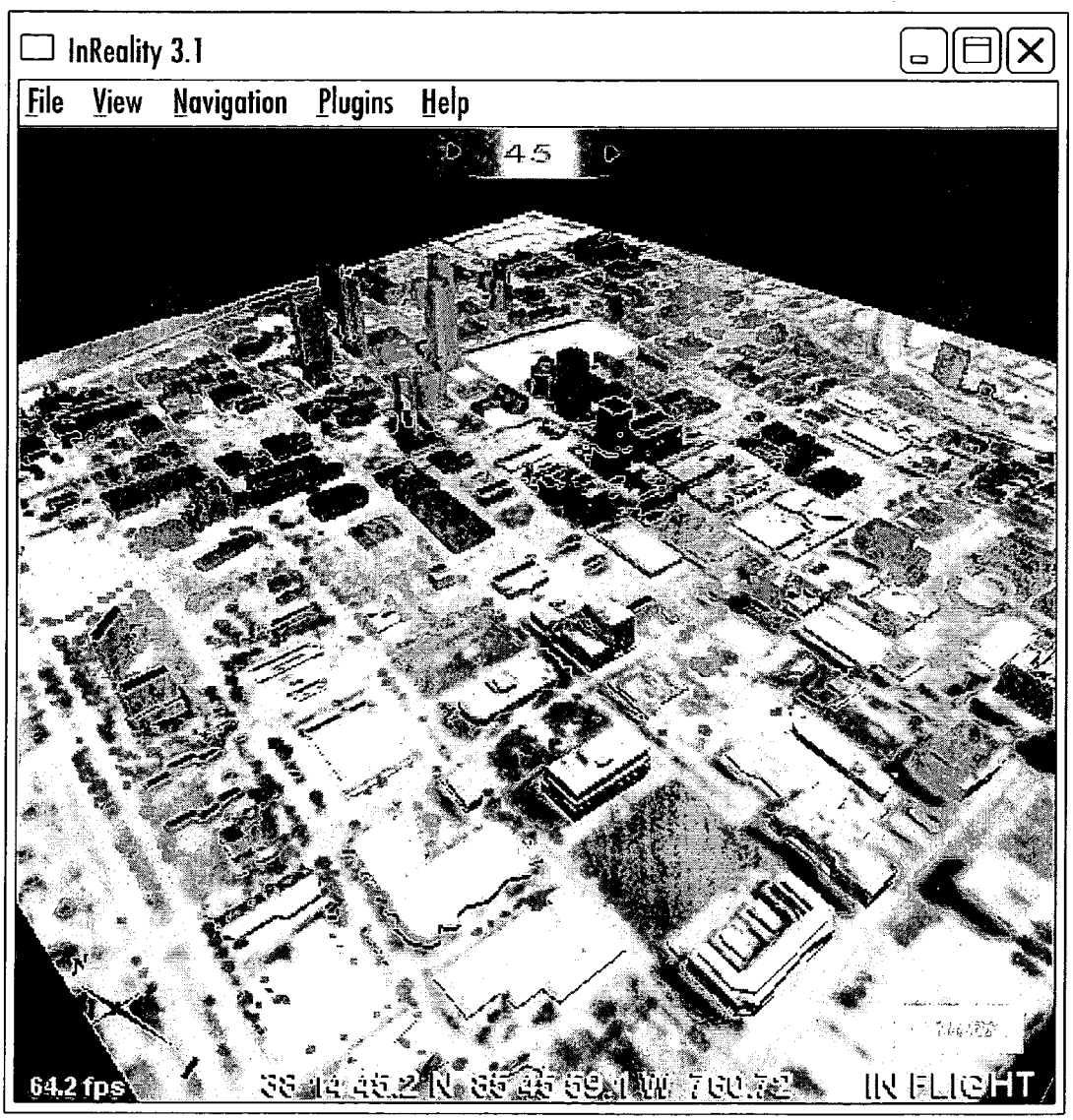
FIG. 29 is a computer screen display of a topographical model generated in accordance with the present invention.

In Block 132, SceneBuilder™ is used to format all of the generated geometry and textures for display on the computer system 60. SceneBuilder™ is also a commercially available tool. Using InReality™ in Block 134, the final topographical model for display is provided, as illustrated in FIG. 29. InReality™ is another commercially available tool developed by the Harris Corporation, and allows the user to navigate virtual scenes and conduct various analyses. InReality™ is designed to be a companion to the RealSite™ software. The process ends at Block 136.

Many modifications and other embodiments of the invention will come to the mind of one skilled in the art having the benefit of the teachings presented in the foregoing descriptions and the associated drawings. In addition, other features relating to topographical modeling are disclosed in copending patent application filed concurrently herewith and assigned to the assignee of the present invention and is entitled METHOD AND APPARATUS FOR DISTINGUISHING FOLIAGE FROM BUILDINGS FOR TOPOGRAPHICAL MODELING, attorney docket number GCSD-1628 (51416), the entire disclosure of which is incorporated herein in its entirety by reference. Therefore, it is understood that the invention is not to be limited to the specific embodiments disclosed, and that modifications and embodiments are intended to be included within the scope of the appended claims.

That which is claimed is:

1. A computer implemented method for processing an original digital elevation model (DEM) including data for terrain and a plurality of objects thereon, the method comprising:
   generating a lower-resolution DEM from the original DEM;
   generating an objects-only DEM based upon a comparison of the lower-resolution DEM and the original DEM; and
   reducing noise in the objects-only DEM.

2. A computer implemented method according to claim 1 wherein reducing noise in the objects-only DEM comprises:
   identifying nulls in the objects-only DEM based upon a first window size;
   expanding the nulls identified in the objects-only DEM; and
   filling in the expanded nulls in the objects-only DEM to generate a first refined objects-only DEM.

3. A computer implemented method according to claim 2 further comprising:
   identifying nulls in the first refined objects-only DEM based upon the first window size;
   expanding the nulls identified in the first refined objects-only DEM; and
   filling in the expanded nulls in the first refined objects-only DEM to generate a second refined objects-only DEM.

4. A computer implemented method according to claim 3 further comprising generating a noise-only DEM based upon a comparison between the first refined objects-only DEM and the second refined objects-only DEM.

5. A computer implemented method according to claim 4 further comprising subtracting the noise-only DEM from the second refined objects-only DEM for generating a final refined objects-only DEM.

6. A computer implemented method for processing a digital elevation model (DEM) including data for a terrain and a plurality of objects on the terrain, the method comprising:
   generating a lower-resolution DEM from the original DEM;
   identifying nulls in the lower-resolution DEM based upon a first window size, and filling in the nulls;
   generating an objects-only DEM based upon a comparison of the lower-resolution DEM with the filled-in nulls and the original DEM;
   generating an original DEM without the objects based upon a comparison between the objects-only DEM and the original DEM;
   identifying nulls in the original DEM without the objects based upon the first window size, and expanding the nulls;
   generating a lower-resolution DEM without the objects from the original DEM without the objects;
   identifying nulls in the lower-resolution DEM without the objects based upon the first window size, and filling in the nulls for generating a terrain-only DEM; and
   generating a refined objects-only DEM based upon a comparison of the terrain-only DEM with the original DEM.

7. A computer implemented method according to claim 6 further comprising:
   generating a refined DEM without the objects based upon a comparison between the refined objects-only DEM and the original DEM;
   generating a lower-resolution DEM without the objects from the refined DEM without the objects; and
   identifying nulls in the lower-resolution DEM without the objects based upon the first window size, and filling in the nulls for generating a refined terrain-only DEM.

8. A computer implemented method according to claim 7 further comprising generating a final refined objects-only DEM based upon a comparison of the refined terrain-only. DEM with the original DEM.

9. A computer-readable medium having stored thereon a data structure for processing a digital elevation model (DEM) including data for terrain and a plurality of objects thereon, the computer-readable medium comprising:
   a first data field containing data for generating a lower-resolution DEM from the original DEM;
   a second data field containing data for generating an objects-only DEM based upon a comparison of the lower-resolution DEM and the original DEM; and
   a third data field containing data for reducing noise in the objects-only DEM.

10. A computer-readable medium according to claim 9 wherein the third data field for reducing noise in the objects-only DEM comprises:
    a fourth data field containing data for identifying nulls in the objects-only DEM based upon a first window size;

a fifth data field containing data for expanding the nulls identified in the objects-only DEM; and a sixth data field containing data for filling in the expanded nulls in the objects-only DEM to generate a first refined objects-only DEM.

11. A computer-readable medium according to claim 10 further comprising:

a seventh data field containing data for identifying nulls in the first refined objects-only DEM based upon the first window size;

an eighth data field containing data for expanding the nulls identified in the first refined objects-only DEM; and a ninth data field containing data for filling in the expanded nulls in the first refined objects-only DEM to generate a second refined objects-only DEM.

12. A computer-readable medium according to claim 11 further comprising a tenth data field containing data for generating a noise-only DEM based upon a comparison between the first refined objects-only DEM and the second refined objects-only DEM.

13. A computer-readable medium according to claim 12 further comprising an eleventh data field containing data for subtracting the noise-only DEM from the second refined objects-only DEM for generating a final refined objects-only DEM.

14. A computer-readable medium for processing a digital elevation model (DEM) including data for a terrain and a plurality of objects on the terrain, the computer-readable medium comprising:

a first data field containing data for generating a lower-resolution DEM from the original DEM;

a second data field containing data for identifying nulls in the lower-resolution DEM based upon a first window size, and filling in the nulls;

a third data field containing data for generating an objects-only DEM based upon a comparison of the lower-resolution DEM with the filled in nulls and the original DEM;

a fourth data field containing data for generating an original DEM without the objects based upon a comparison between the objects-only DEM and the original DEM;

a fifth data field containing data for identifying nulls in the original DEM without the objects based upon the first window size, and expanding the nulls;

a sixth data field containing data for generating a lower-resolution DEM without the objects from the original DEM without the objects;

a seventh data field containing data for identifying nulls in the lower-resolution DEM without the objects based upon the first window size, and filling in the nulls for generating a terrain-only DEM; and an eighth data field containing data for generating a refined objects-only DEM based upon a comparison of the terrain-only DEM with the original DEM.

15. A computer-readable medium according to claim 14 further comprising:

a ninth data field containing data for generating a refined DEM without the objects based upon a comparison between the refined objects-only DEM and the original DEM;

a tenth data field containing data for generating a lower-resolution DEM without the objects from the refined DEM without the objects; and an eleventh data field containing data for identifying nulls in the lower-resolution DEM without the objects based upon the first window size, and filling in the nulls for generating a refined terrain-only DEM.

16. A computer-readable medium according to claim 15 further comprising a twelfth data field containing data for generating a final refined objects-only DEM based upon a comparison of the refined terrain-only DEM with the original DEM.

17. A computer system for topographical modeling comprising:

a processor for processing an original digital elevation model (DEM) including data for terrain and a plurality of objects thereon, the processing comprising generating a lower-resolution DEM from the original DEM, generating an objects-only DEM based upon a comparison of the lower-resolution DEM and the original DEM, and reducing noise in the objects-only DEM; and a display coupled to said processor for displaying a topographical model based upon the processing.

18. A computer system according to claim 17 wherein said processor for reducing noise in the objects-only DEM performs the following:

identifies nulls in the objects-only DEM based upon a first window size;

expands the nulls identified in the objects-only DEM; and fills in the expanded nulls in the objects-only DEM to generate a first refined objects-only DEM.

19. A computer system according to claim 18 wherein said processor further performs the following:

identifies nulls in the first refined objects-only DEM based upon the first window size;

expands the nulls identified in the first refined objects-only DEM; and fills in the expanded nulls in the first refined objects-only DEM to generate a second refined objects-only DEM.

20. A computer system according to claim 19 wherein said processor generates a noise-only DEM based upon a comparison between the first refined objects-only DEM and the second refined objects-only DEM.

21. A computer system according to claim 20 wherein said processor subtracts the noise-only DEM from the second refined objects-only DEM for generating a final refined objects-only; and wherein said display displays the topographical model based upon the final refined objects-only.

22. A computer system for topographical modeling comprising:

a processor for processing an original digital elevation model (DEM) including data for terrain and a plurality of objects thereon, the processing comprising generating a lower-resolution DEM from the original DEM, identifying nulls in the lower-resolution DEM based upon a first window size, and filling in the nulls, generating an objects-only DEM based upon a comparison of the lower-resolution DEM with the filled-in nulls and the original DEM, generating an original DEM without the objects based upon a comparison between the objects-only DEM and the original DEM, identifying nulls in the original DEM without the objects based upon the first window size, and expanding the nulls, generating a lower-resolution DEM without the objects from the original DEM without the objects, identifying nulls in the lower-resolution DEM without the objects based upon the first window size, and filling in the nulls for generating a terrain-only DEM, and generating a refined objects-only DEM based upon a comparison of the terrain-only DEM with the original DEM; and a display coupled to said processor for displaying a topographical model based upon the processing.

23. A computer system according to claim 22 wherein said processor further performs the following:

generating a refined DEM without the objects based upon a comparison between the refined objects-only DEM and the original DEM;

generating a lower-resolution DEM without the objects from the refined DEM without the objects; and identifying nulls in the lower-resolution DEM without the objects based upon the first window size, and filling in the nulls for generating a refined terrain-only DEM.

24. A computer system according to claim 23 wherein said processor further generates a final refined objects-only DEM based upon a comparison of the refined terrain-only DEM with the original DEM.

* * * * *